May 24, 1966 K. STAEHLE ETAL 3,252,378
DIRECTIONAL DRIVE CONTROL SYSTEM FOR MACHINE TOOLS OR THE LIKE
Filed April 16, 1964 5 Sheets-Sheet 1

Inventors
KARL STAEHLE
HERMANN STRAUB
by Albert M. Zalkind

May 24, 1966　　　K. STAEHLE ETAL　　　3,252,378
DIRECTIONAL DRIVE CONTROL SYSTEM FOR MACHINE TOOLS OR THE LIKE
Filed April 16, 1964　　　　　　　　　　　　　　5 Sheets-Sheet 3
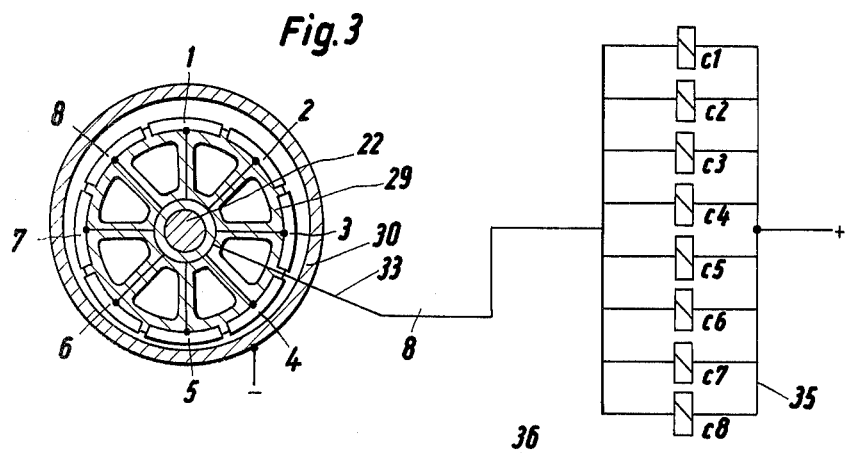
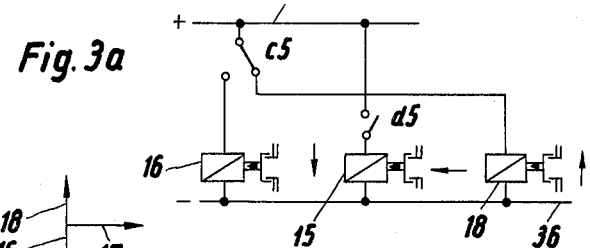
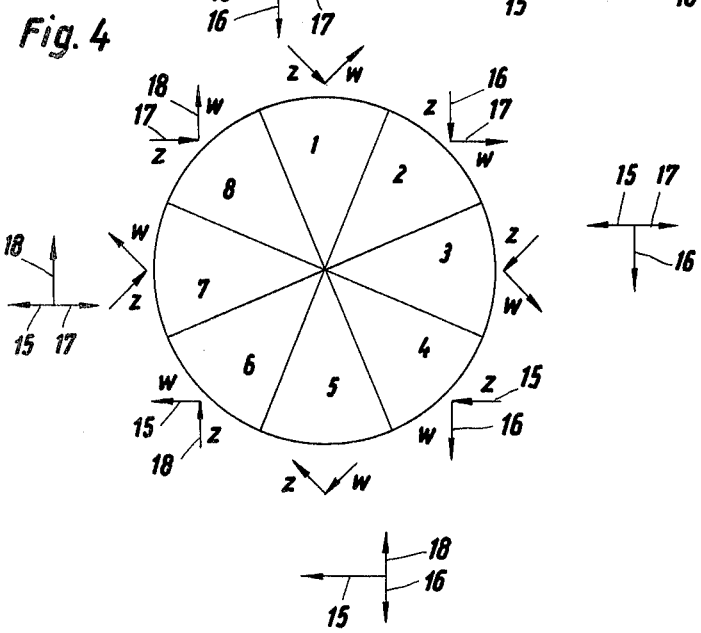
Inventors
KARL STAEHLE
HERMANN STRAUB May 24, 1966     K. STAEHLE ETAL     3,252,378
DIRECTIONAL DRIVE CONTROL SYSTEM FOR MACHINE TOOLS OR THE LIKE
Filed April 16, 1964                 5 Sheets-Sheet 5

Inventors
KARL STAEHLE
HERMANN STRAUB

United States Patent Office 3,252,378
Patented May 24, 1966

3,252,378
DIRECTIONAL DRIVE CONTROL SYSTEM FOR MACHINE TOOLS OR THE LIKE
Karl Staehle and Hermann Straub, both of Friedrichshafen, Germany, assignors to Zahnradfabrik Friedrichshafen Aktiengesellschaft, Friedrichshafen, Germany
Filed Apr. 16, 1964, Ser. No. 360,328
Claims priority, application Germany, Apr. 20, 1963, Z 10,065
6 Claims. (Cl. 90—62)

This invention relates to a directional drive control system programmed by a control surface, profile or template particularly suited for machine tool operation.

The present invention, therefore, pertains to the control of work feed and/or tool motion in machine tool operations whereby shapes, curvatures and profiles on workpieces are formed under the control of a programming surface or template in order to produce such parts as cams, gears, etc. As in prior systems, a programming surface follower device is utilized in the system of the present invention to directionally control movement in accordance with displacements imparted thereto when the follower device is moved relative to the programming surface. However, because of the present system and the manner in which the follower device develops the motion controlling signals, several disadvantages of prior art systems and apparatus are avoided.

One important object of the present invention, therefore, is to provide a directional drive control system capable of producing programmed motion without use of any quadrant reversing gear mechanism and, hence, without the usual movement limits imposed on the follower device. Accordingly, inherently less overcontrol and more rapid feed rates are attainable in connection with the programmed displacement of the follower device and the motion controlling signals derived therefrom.

In accordance with the foregoing object, the follower device of the present invention includes a housing suitably mounted for relative movement between the programming surface and a surface contacting element rotatably mounted on the end of a flexure rod projecting from the housing. The flexure rod is fixedly anchored at its other end within the housing so that it may be elastically deflected in any radial direction with respect to its longitudinal axis. In one specific embodiment of the invention, an annular mounting ring is secured to the flexure rod within the housing to mount a plurality of circumferentially spaced electrical contacts in insulated relation to each other. An annular contact ring fixed to the housing in encircling relation to the contacts is thereby engaged by one of the contacts in response to deflection of the flexure rod by the programming surface. Engagement of the contacts are operative to produce directional control signals whereby electrically energized devices, such as electromagnetic solenoid actuators for clutches, may exercise directional control over a drive arrangement. Toward this latter end, the contacts are connected to electrical conductors which extend into the housing and form part of an electrical control circuit through which at least one of the solenoid devices are energized at any instant to effect drive in one direction. Engagement of any contact in response to deflection of the flexure rod in any radial direction is operative through a relay switching assembly to replace at least one of the solenoid devices energized just prior to engagement of the contact.

A further object of the present invention is to provide a follower device for the directional drive control system aforementioned having facilities for releasing the electrically energized devices in response to deflection of the flexure rod by an excessive amount so as to prevent any directional overcontrol. The accuracy of the system is also further enhanced by damping any vibration induced in the flexure rod by its deflection. A suitable viscous, damping fluid, such as oil, may, therefore, be confined within the housing.

A still further object of the present invention is to provide a directional control system associated with the aforementioned follower device operative to effect engagement of different combinations of one or two clutches or the like from a group of clutches having different drive directions associated therewith. Through relay switching or deflection sensing means, selection of the clutches for engagement is made so as to produce resultant movements in diverging approach and departing directions with respect to the angular orientation of the contact correspondingly approaching and departing from engagement. In the specific embodiment described, four clutches directionally controlling drive in directions spaced 90 degrees apart are either singly engaged or engaged in pairs to produce an eight sector pattern of approaching and departing motions corresponding to the angular spacing of the contacts on the flexure rod of the follower device. Selection of the clutches to be engaged is, therefore, effected by signals derived by engagement of the contacts when the flexure rode is deflected in instantaneous directions by the programming surface.

These together with other objects and advantages which will become subsequently apparent reside in the details of construction and operation as more fully hereinafter described and claimed, reference being had to the accompanying drawings forming part hereof in which:

FIGURE 3 is an enlarged transverse sectional view taken substantially through a plane indicated by section line III—III in FIGURE 2;

FIGURE 3a is a partial electrical circuit diagram of the energizing circuit of the control system;

FIGURE 4 is a diagram of the directional control pattern associated with the system of the present invention;

Figure 1:
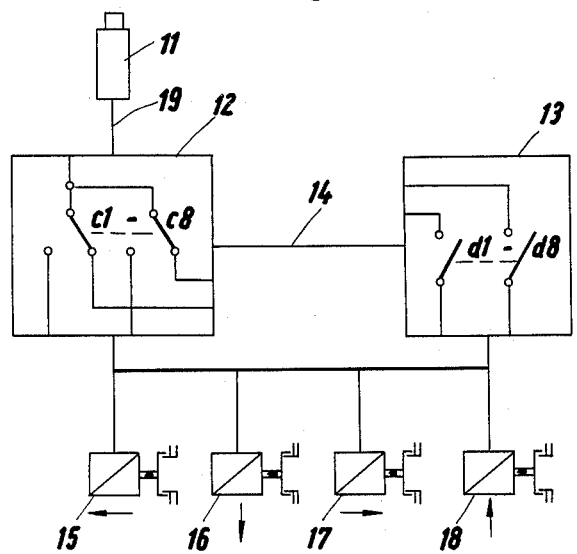
FIGURE 1 is a schematic block diagram of the control system of the present invention.

Referring now to the drawings in detail and initially to FIGURE 1, it will be understood that a signal transmitting follower device generally denoted by reference numeral 11 is in contact engagement with a programming surface of template (not shown) so that directional control signals may be dispatched therefrom through the diagrammatically illustrated circuit 19. The directional control signals are produced during relative movement between the follower device 11 and the template and are fed to a plurality of solenoid actuator devices 15, 16, 17 and 18 through relay switching assemblies 12 and 13 interconnected by the diagrammatically illustrated circuit 14. Energization of the solenoid devices is operative to effect drive in the different directions denoted by the arrows in FIGURE 1 through engagement of clutches, actuation of pilot valves or actuation of other hydraulic or mechanical components of the drive arrangement for a machine tool, the details of which form no part of the present invention. Also, the switching relay assemblies 12 and 13 may be made to perform the functions thereof utilizing different components and arrangements including semi-conductor circuitry.

Figure 2:
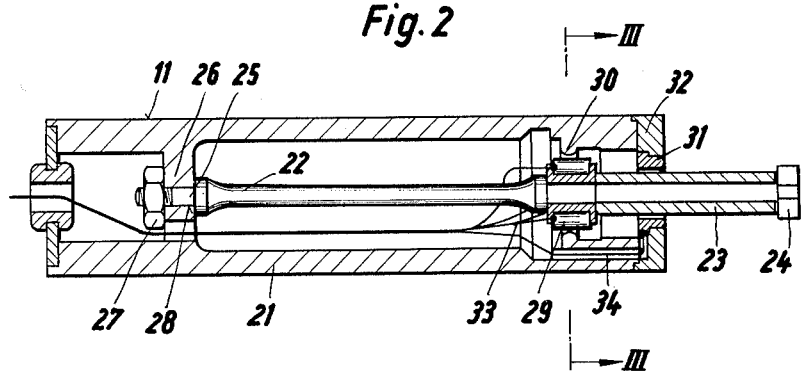
FIGURE 2 is a longitudinal section view through the signal transmitting follower device shown in FIGURE 1.

According to one form of the invention, the follower device 11, as shown in FIGURES 2 and 3, includes an axially elongated housing member 21 which is electrically grounded. A flexure rod 22 is fixedly anchored at one end 25 within the housing by means of the nut 27 threadedly connected to the end 25 and abutting the intermediate wall 26 having an opening 28 through which the end 25 extends. The flexure rod projects from one axial end of the housing 21 so that the projecting end portion 23 may be deflected in any radial direction with respect to the longitudinal axis of the housing by engagement of the programming surface with the follower element 24 rotatably mounted for frictionless contact. It will be apparent that a suitable damping fluid may be confined within the housing in surrounding relation to the flexure rod for damping any vibration induced by its deflection.

Fixedly mounted on the flexure rod within the housing and between the end portion 23 and a thrust shoulder, is an annular collector ring 29 on which eight circumferentially spaced contacts are mounted. The contacts are insulated from each other and define eight sectors, one of which produces a directional control signal when the flexure rod is deflected in one instantaneous radial direction by engagement of such contact with an annular contact ring formed within the housing. Electrical conductors 33 extend into the housing through one axial end and are respectively connected to each of the contacts on the mounting ring 29 in order to transmit the directional control signals to the relay switching assembles 12 and 13.

Figure 1A:
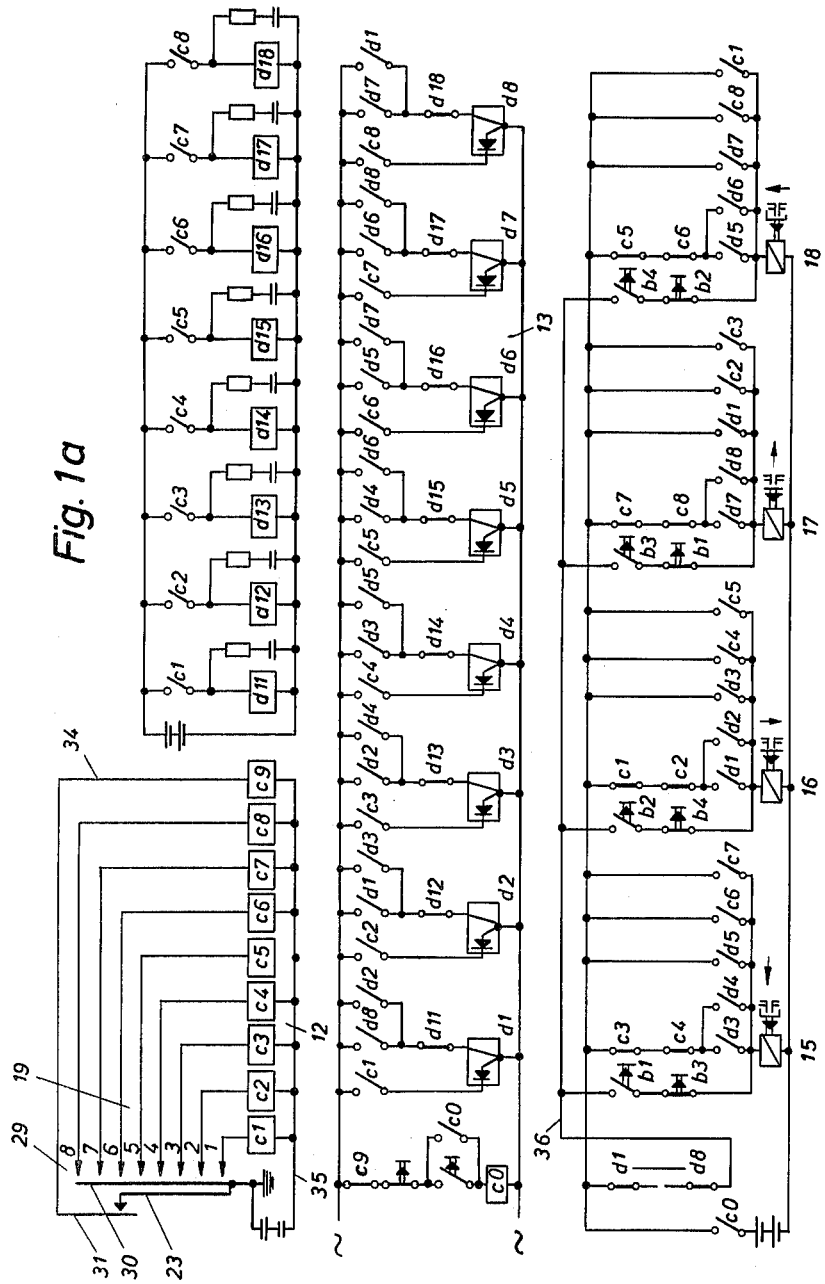
FIGURE 1a is an electrical circuit diagram corresponding to the system depicted in FIGURE 1.

Referring now to FIGURE 1a, one possible circuit arrangement is shown for carrying out the principles of the present invention. Thus, the conductors 33 from the contacts form part of the relay coil energizing circuit 19 for eight relays c1–c8 in the relay assembly 12. The relay coils are connected by conductor 35 to a source of voltage so that when one of the contacts on ring 29 is grounded by engaging ring 30, a corresponding relay coil will be energized. Each relay has associated therewith a pair of fixed contacts respectively connected to two different solenoid devices of the four solenoids 15, 16, 17 and 18. All of the solenoids are connected by conductor 36 to one terminal of an energizing source of voltage so that the relay switches associated with the relays may alternatively complete energizing circuits through two different solenoids to which the fixed relay contacts are connected. Energization of one of the relay coils will, therefore, effect a replacement of one of the solenoids that happen to be energized. At the same time that one of the relay coils of relay assembly 12 is energized, a corresponding relay in the relay assembly 13 is also energized through circuit 14.

The foregoing control circuit is, therefore, operative in accordance with the control pattern depicted in the diagram of FIGURE 4 wherein each contact controlled sector is associated with motion in an approaching direction denoted by arrow $z$ and motion in a departing direction denoted by arrow $w$ representing, for example, feed movement produced by engagement of one or two clutches before and after a particular sector contact is engaged. With continued reference to FIGURE 4 and FIGURE 3a, it will be noted, for example, that prior to engagement of sector contact 5, clutch 18 is engaged so that the resultant approaching motion $z$ occurs because of the engagement of clutch 15 upon de-energization of relay c4. Upon engagement of the sector contact 5, c5 is energized so as to disengage clutch 18 and engage clutch 16. The relay d5 is then also energized so as to continue engagement of clutch 15 producing the resultant departing motion $w$. The clutch 15 is maintained engaged during the transition when the sector contact 5 moves out of contact, because of the time delay remanence in the relays d1 to d8, in order to prevent any interruption in the engagement of the clutch 15 when continued by contact of the following sector contact 6 at the end of the transitional period.

To prevent overcontrol or faulty operation resulting in excessive deflection of the flexible rod, a limit contact ring is mounted at one end of the housing 21 by a nonconductive member 32 through which the end portion of the flexure rod projects. A conductor 34 is connected to the contact ring 31 for conducting a signal to disable the operation in any suitable manner.

Figure 5:
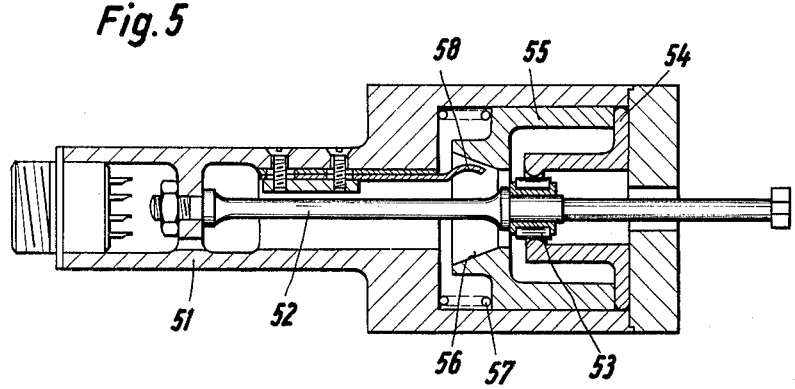
FIGURE 5 is a longitudinal section view through another modified form of follower device.

FIGURE 5 illustrates a modified form of follower device having a housing 51 within which one end of the flexure rod 52 is anchored. The annular contact ring 54 associated with the sector contacts is movably mounted so that excessive deflection of the flexure rod will cause tilting of the contact ring 54 by engagement with the contacts on the mounting ring 53 secured to the flexure rod. Tilting displacement of the contact ring 54 is resisted by the sleeve 55 under the axial bias of spring 57. The sleeve 55 is provided with an internal conical contact surface 56 adapted to engage the fixed contact arm 58 when excessive deflection of the flexure rod occurs. A circuit is thereby closed to stop operation in any suitable manner, as aforementioned to prevent damage to the workpiece being operated on.

Figure 6:
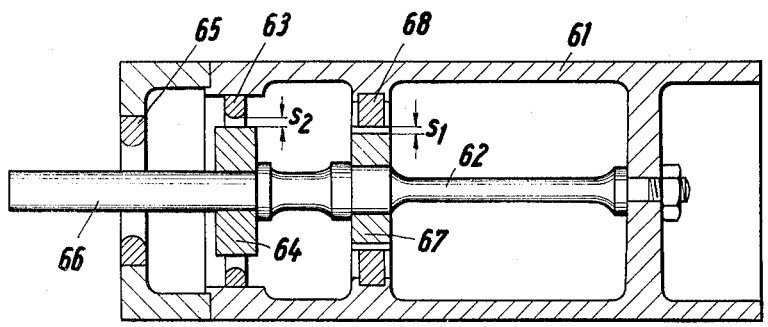
FIGURE 6 is a sectional view of a third form of follower device.

The follower device illustrated in FIGURE 6 differs from those previously described, in that the flexure rod 62 is provided with two axially spaced sets of signal producing contact assemblies 64 and 67. The radial spacings $s1$ and $s2$ between the contacts and the contact rings 63 and 68 within the housing 61 are such that the contacts 67 may remain engaged even though the contacts 64 have disengaged. The control over the solenoid devices may thereby be simplified since contacts 67 may control the alternatively engaged clutches while contacts 64 will control engagement of the transitionally engaged clutches, as hereinbefore described. A limit contact ring 65 is also provided to establish a stoppage signal when excessive deflection occurs.

Figure 7:
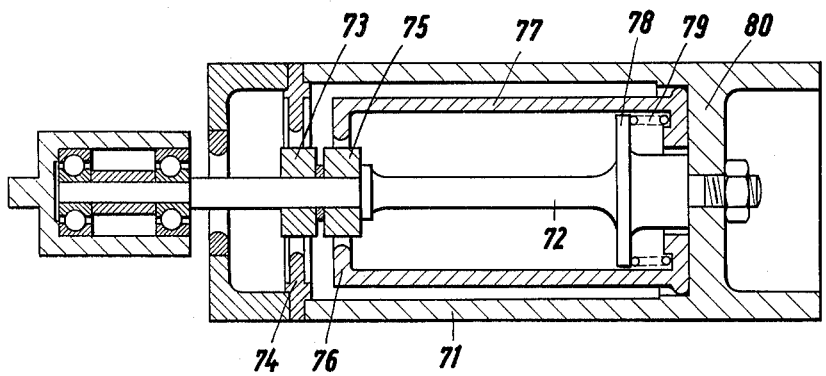
FIGURES 7 and 8 are sectional views of fourth and fifth forms, respectively, of the follower device.

FIGURE 7 also shows a follower device having a pair of axially spaced contact assemblies from which the directional control signals are derived. The contact assembly 75 cooperates with an annular contact ring 76 fixed at one axial end of a movably mounted sleeve 77 disposed within the housing 71. The sleeve 77 is biased to a centered position relative to the flexure rod 72 by means of a spring 79 reacting between a flange 78 on the flexure rod adjacent to the end thereof anchored within the housing and the axial end of the sleeve 77 opposite the contact ring 76. The contact ring is initially engaged by the contact assembly 75 upon deflection of the flexure rod after which the contact assembly 73 engages the contact ring 74 fixedly mounted by the housing. Operation of the follower device depicted in FIGURE 7 is similar to that described with respect to FIGURE 6.

Figure 8:
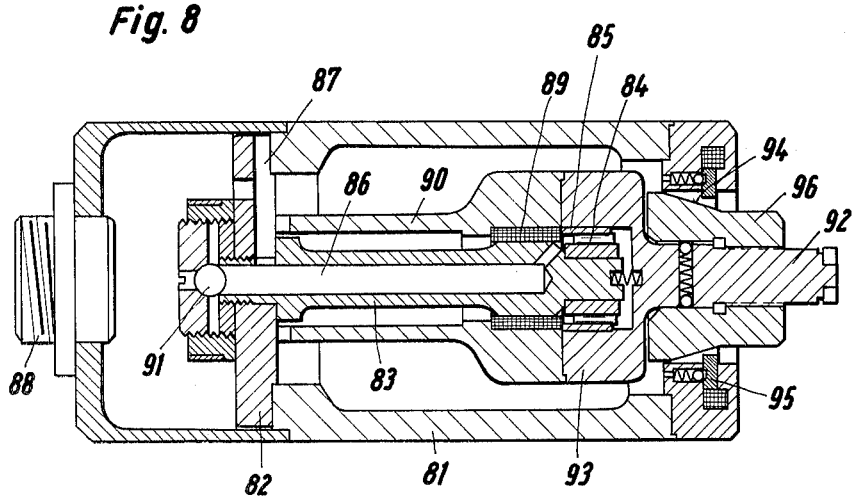

A substantially different form of follower device is illustrated in FIGURE 8. A deflection assembly is provided consisting of a sleeve 90 mounted by means of a universal pivot 91 mounted on the intermediate wall 82 within the housing 81. Connected to the sleeve 90 is a control member 93 provided with an axially extending follower portion 92 which projects from the housing. A shaft 83 is fixedly anchored at one end by threaded connection to the wall 82 in coaxial relation to the sleeve 90. A rubber centering sleeve 89 yieldably maintains the coaxial relationship from which the sleeve 90 is displaced when the follower portion 92 engages the programming surface aforementioned. A signal producing contact assembly 84 is mounted on the free end of the shaft 83 for cooperation with the annular contact ring 85 internally secured to the control member 93. Operation of the follower device will be apparent. Also, limit releasing facilities are provided in the form of a bushing element 96 threadedly mounted on the follower portion 92. The external conical surface 94 on the element 96 is, therefore, adapted to engage the limit contact ring 95 when excessive displacement of the follower portion occurs, in order to establish a stoppage signal as hereinbefore described in connection with the other follower devices. The shaft 83 on which the contact assembly 84 is mounted may also be provided with a bore 86 through which electrical conductors may extend (not shown) for transmitting the directional control signals from the contact assembly to the circuit panel 88. Passages 87 may be formed in the wall 82 through which the electrical conductors pass into the bore 86 of the shaft 83.

The foregoing is considered as illustrative only of the principles of the invention. Accordingly, all suitable modifications and equivalents may be resorted to, falling within the scope of the invention as claimed.

What is claimed as new is as follows:

1. In a drive control system adapted to control operation of clutches in a machine tool in accordance with a programming surface, a surface contacting signal transmitter (11) electrically connected to said clutches comprising a housing member (21), flexure means (22) having one end (25) fixedly mounted in said housing member and an opposite end (23) projecting from the housing member, surface following means (24) mounted on said opposite end of the flexure means for deflecting the flexure means upon engagement with the programming surface, contact means (29 and 30) including a plurality of contacts (29) disposed within the housing member in spaced insulated relation to each other for electrically operating said clutches, and means mounting the contact means on the flexure means for operating said clutches in response to deflection thereof, a damping fluid disposed within the housing member for damping vibration of the flexure member induced by deflection thereof.

2. In a drive control system adapted to control operation of clutches in a machine tool in accordance with a programming surface, a surface contacting signal transmitter (11) electrically connected to said clutches comprising, a housing member (21), flexure means (22) having one end (25) fixedly mounted in said housing member and an opposite end (23) projecting from the housing member, surface following means (24) mounted on said opposite end of the flexure means for deflecting the flexure means upon engagement with the programming surface, contact means (29 and 30 )including a plurality of contacts (29) disposed within the housing member in spaced insulated relation to each other for electrically operating said clutches, and means mounting for contact means on the flexure means for operating said clutches in response to deflection thereof, including limit release means (31) operatively connected to the control circuit for disabling the electrically energized devices in response to deflection of the flexure means in excess of a predetermined amount, wherein said limit release means comprises, an annular contact element mounted on the housing member and surrounding said flexure means for engagement by the flexure means only after closing of the contact means.

3. In a drive control system adapted to control operation of clutches in a machine tool in accordance with a programming surface, a surface contacting signal transmitter (11) electrically connected to said clutches comprising, a housing member (21), flexure means (22) having one end (25) fixedly mounted in said housing member and an opposite end (23) projecting from the housing member, surface following means (24) mounted on said opposite end of the flexure means for deflecting the flexure means upon engagement with the programming surface, contact means (29 and 30) including a plurality of contacts (29) disposed within the housing member in spaced insulated relation to each other for electrically operating said clutches, and means mounting the contact means on the flexure means for operating said clutches in response to deflection thereof, including limit release means (31) operatively connected to the control circuit for disabling the electrically energized devices in response to deflection of the flexure means in excess of a predetermined amount, wherein said limit release means comprises, a sleeve (55) having a contact surface portion (56) movably mounted within the housing member, a fixed contact (58) element mounted in the housing member, means (54) mounted by the contact means and engageable with said sleeve for displacement of the contact surface portion into contact with the fixed contact element in response to deflection of the flexure means beyond said predetermined amount, and spring means (57) biasing the sleeve to a position with the contact surface portion out of contact with the fixed contact element.

4. In a drive control system adapted to control operation of clutches in a machine tool in accordance with a programming surface, a surface contacting signal transmitter (11) electrically connected to said clutches comprising a housing member (21), flexure means (22) having one end (25) fixedly mounted in said housing member and an opposite end (23) projecting from the housing member, surface following means (24) mounted on said opposite end of the flexure means for deflecting the flexure means upon engagement with the programming surface, contact means (29 and 30) including a plurality of contacts (29) disposed within the housing member in spaced insulated relation to each other for electrically operating said clutches, and means mounting the contact means on the flexure means for operating said clutches in response to deflection thereof, wherein said flexure means comprises, a shaft (83) having one end fixedly mounted in the housing member, a sleeve (90) mounted about the shaft and connected to said surface following means (92), and universal means (91) pivotally mounting the sleeve within the housing member (81) for pivotal displacement relative to the shaft, said contact means (84) being mounted on the shaft at an end opposite said one end.

5. In a drive control system adapted to control operation of clutches in a machine tool in accordance with a template, comprising a support means, flexure means having one end fixedly carried by said support means and an opposite end disposed to follow a template for deflecting said flexure means in the course of following, a set of contacts carried by one of said means for respective clutches and being circumferentially spaced, coacting contact means engageable by said contacts responsive to deflection of said flexure means for effecting control signals for respective clutches, said contacts being sufficiently closely spaced and arranged so that a pair of adjacent contacts may simultaneously engage said coacting contact means, whereby respective clutches are controlled simultaneously, said contacts being carried by said flexure means and said contact means comprising a metallic ring surrounding said contacts and radially spaced therefrom and being engageable at any point along its annular surface by said contacts.

6. In a system as set forth in claim 5, said flexure means comprising a rod, and a limit signal device comprising a metallic ring surrounding said rod and carried by said support means whereby engagement of said rod approaching said ring from any radial direction will effect electrically conductive engagement.

References Cited by the Examiner

UNITED STATES PATENTS

| | | | |
|---|---|---|---|
| 1,840,853 | 1/1932 | Shaw et al. | 90—62 |
| 2,397,108 | 3/1946 | Hanna et al. | 90—62 X |
| 2,839,733 | 6/1958 | Bassett | 90—62 X |
| 3,094,899 | 6/1963 | Otis | 90—62 |

WILLIAM W. DYER, JR., *Primary Examiner.*

G. A. DOST, *Assistant Examiner.*